United States Patent
Shay et al.

(10) Patent No.: US 12,032,555 B2
(45) Date of Patent: Jul. 9, 2024

(54) TECHNIQUES FOR SYNCHRONOUS ACCESS TO DATABASE REPLICAS

(71) Applicant: GONG.io Ltd., Ramat Gan (IL)

(72) Inventors: Zohar Shay, Even Yehuda (IL); Golan Levy, Ramat Gan (IL); Elad Swisa, Herzeliya (IL)

(73) Assignee: GONG.io Ltd., Ramat Gan (IL)

( * ) Notice: Subject to any disclaimer, the term of this patent is extended or adjusted under 35 U.S.C. 154(b) by 86 days.

(21) Appl. No.: 17/804,701

(22) Filed: May 31, 2022

(65) Prior Publication Data

US 2023/0409556 A1 Dec. 21, 2023

(51) Int. Cl.
*G06F 16/23* (2019.01)
*G06F 16/27* (2019.01)
*G06F 16/28* (2019.01)

(52) U.S. Cl.
CPC ...... *G06F 16/2365* (2019.01); *G06F 16/2322* (2019.01); *G06F 16/2379* (2019.01); *G06F 16/275* (2019.01); *G06F 16/284* (2019.01)

(58) Field of Classification Search
CPC ............. G06F 16/2365; G06F 16/2379; G06F 16/2322; G06F 16/284; G06F 16/275
See application file for complete search history.

(56) References Cited

U.S. PATENT DOCUMENTS

| | | | | |
|---|---|---|---|---|
| 7,827,144 B1* | 11/2010 | Saito | ............. | G06F 16/2322 |
| | | | | 707/638 |
| 9,116,862 B1* | 8/2015 | Rath | ............. | G06F 3/0683 |
| 9,600,514 B2* | 3/2017 | Hugg | ............. | G06F 16/273 |
| 10,078,657 B2* | 9/2018 | Ji | ............. | G06F 16/2365 |
| 11,630,838 B1* | 4/2023 | Gujral | ............. | G06F 16/9024 |
| | | | | 707/625 |
| 2009/0094195 A1 | 4/2009 | Black | | |
| 2012/0150802 A1* | 6/2012 | Popov | ............. | G06F 11/2094 |
| | | | | 707/635 |
| 2012/0331335 A1 | 12/2012 | Judin et al. | | |
| 2014/0324785 A1* | 10/2014 | Gupta | ............. | G06F 16/2358 |
| | | | | 707/689 |

(Continued)

OTHER PUBLICATIONS

Amazon Aurora. "Aurora Replica Status: Displays the status of all Aurora PostgreSQL reader nodes." https://docs.aws.amazon.com/AmazonRDS/latest/AuroraUserGuide/aurora_replica_status.html.

*Primary Examiner* — Huawen A Peng
(74) *Attorney, Agent, or Firm* — M&B IP Analysts, LLC

(57) ABSTRACT

A method and system for providing consistency in read-after-write operations in a multi-replica relational database system (RDS) are provided. The method includes receiving a read transaction to read data from a database (DB) replica of the multi-replica RDS; obtaining counter values of DB replicas in the multi-replica RDS, a counter value of determines a current version of recent data stored in the respective DB replica; determining a write replica out of the DB replicas in the multi-replica RDS; determining if there is an available read replica, a read replica is a replica other than the determined write replica having counter value at least equals to a counter value of the write replica; and waiting, when there is no available read replica, a preconfigured time window to allow all replicas to synchronize with the write replica; and reading the data from a read replica when the preconfigured time window has elapsed.

20 Claims, 7 Drawing Sheets

(56) References Cited

U.S. PATENT DOCUMENTS

2017/0091228 A1* 3/2017 Middlekauff ......... G06F 16/273
2017/0270149 A1   9/2017 Grosman et al.
2019/0332267 A1* 10/2019 Muniswamy-Reddy ...................
                                                        G06F 3/065
2022/0164351 A1   5/2022 Chen et al.

* cited by examiner

TECHNIQUES FOR SYNCHRONOUS ACCESS TO DATABASE REPLICAS

TECHNICAL FIELD

The present disclosure generally relates to databases, and specifically techniques for techniques for providing synchronous access to database replicas.

BACKGROUND

Database replication is the frequent electronic copying of data from a database on one server to another database. The result of database replication is a distributed database in which users can quickly access data relevant to their tasks without interfering with the work of others. Numerous elements contribute to the overall process of creating and managing database replication.

Database replication involves one or more applications that connect a primary storage location with a secondary location that is often off-site. Today, those primary and secondary storage locations are most often individual source databases, such as Oracle®, MySQL®, Microsoft SQL®, and MongoDB®, as well as data warehouses that amalgamate data from these sources, offering storage and analytics services on larger quantities of data. Data warehouses are often hosted in the cloud.

There are different database replication techniques, each of which is implemented by a different database system. The replication techniques may include asynchronous and synchronous replication. The asynchronous replication is when the data is sent to a server, which acknowledges the reception of the data. Then, the server starts copying data to the replicas at an unspecified or monitored pace. Synchronous replication is when data is copied from the client to a server and then replicated to all the replica servers before the client is notified that data has been replicated. The synchronous replication takes longer to verify than the asynchronous method, but the synchronous replication presents the advantage of ensuring that all data was copied before proceeding.

FIG. 1 is an example of diagram 100 illustrating database replications in a cloud computing environment. FIG. 1 shows a plurality of database replicas 110-1 through 110-N (wherein N is an integer is greater than 1), a storage volume 120, and a plurality of clients 130-1 through 130-M (where M an integer is greater than 1).

The database (DB) replicas 110-1 through 110-N are geographically distributed and may be deployed in a cloud computing environment. The storage volume 120 may also include a cloud storage. The clients 130 may execute applications and/or services that can read or write from the DB replicas 110. The clients 130 may include application servers or other types of servers.

The replication model can be a single-leader architecture where one database replica (e.g., a replica 110-1) receives write requests from clients, and copies data to all other replicas 110-2 through 110-N. The data can be read from all replicas 110-2 through 110-N.

Another replication model is a no-leader architecture where every database replica (110-$i$) can receive writes and serve as a model for all other database replicas (110-$j$, $i \neq j$). The no-leader architecture is common in a cloud computing environment.

Although the multi-replica architecture provides scalability, flexibility, and better performances in cloud applications, such architecture suffers from a read-after-write consistency problem. That is, when a client 130-$i$ attempts to read data from a replica 110, the client 130-$i$ does not become aware of where the most recent copy of the data is saved.

The read-after-write consistency problem is a prominent problem in cloud-based database replica solutions, such as Aurora by Amazon®. Aurora is a relational database system (RDS) that provides compatibility with MySQL and PostgreSQL. In Aurora, every data write is replicated into multiple (e.g., 6) replicas that can be geographically distributed. All data in the replicas are also streamed to cloud storage. A DB replica is a virtual machine with a processor and cache to store the data. Transactions and queries on the data stored in the replicas can be performed using MySQL and PostgreSQL.

A multi-replica RDS, such as an Aurora, requires writing data to a single DB replica (110-$i$) (a primary replica) where the data is replicated to all other DB replicas. All data is written with a current timestamp. It may take a few milliseconds up to a minute until all replicas are synchronized. This may cause a read-after-write consistency problem, where a not recent version of the data is read from the replica. Further, the selection of a primary replica may be dynamically changed, which complicates the read-after-write problem, as the write DB replica can change at every transaction. The write DB replica may be changed in cases of a restart or a failover.

Currently, there are no solutions that ensure consistency between the data written and the data read from the replicas in multi-replica RDS, such as Aurora. Thus, the performance of applications and specifically cloud applications utilizing multi-replicate RDS are demoted, and data integrity cannot be achieved.

It would therefore be advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for method for providing consistency in read-after-write operations in a multi-replica relational database system (RDS). The method comprising receiving a read transaction to read data from a database (DB) replica of the multi-replica RDS; obtaining counter values of DB replicas in the multi-replica RDS, wherein a counter value of a DB replica in the multi-replica RDS determines a current version of recent data stored in the respective DB replica; determining a write replica out of the DB replicas in the multi-replica RDS; determining if there is an available read replica, wherein a read replica is a replica other than the determined write replica having counter value at least equals to a counter value of the write replica; waiting, when there is no available read replica, a preconfigured time window to allow all replicas to synchronize with the write replica; and reading the data from a read replica when the preconfigured time window has elapsed.

Certain embodiments disclosed herein include a controller for providing consistency in read-after-write operations in a multi-replica relational database system (RDS), comprising: a processing circuitry; and a memory, the memory containing instructions that, when executed by the processing circuitry, configure the controller to: receive a read transaction to read data from a database (DB) replica of the multi-replica RDS; obtain counter values of DB replicas in the multi-replica RDS, wherein a counter value of a DB replica in the multi-replica RDS determines a current version of recent data stored in the respective DB replica; determine a write replica out of the DB replicas in the multi-replica RDS; determine if there is an available read replica, wherein a read replica is a replica other than the determined write replica having counter value at least equals to a counter value of the write replica; wait, when there is no available read replica, a preconfigured time window to allow all replicas to synchronize with the write replica; and read the data from a read replica when the preconfigured time window has elapsed.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
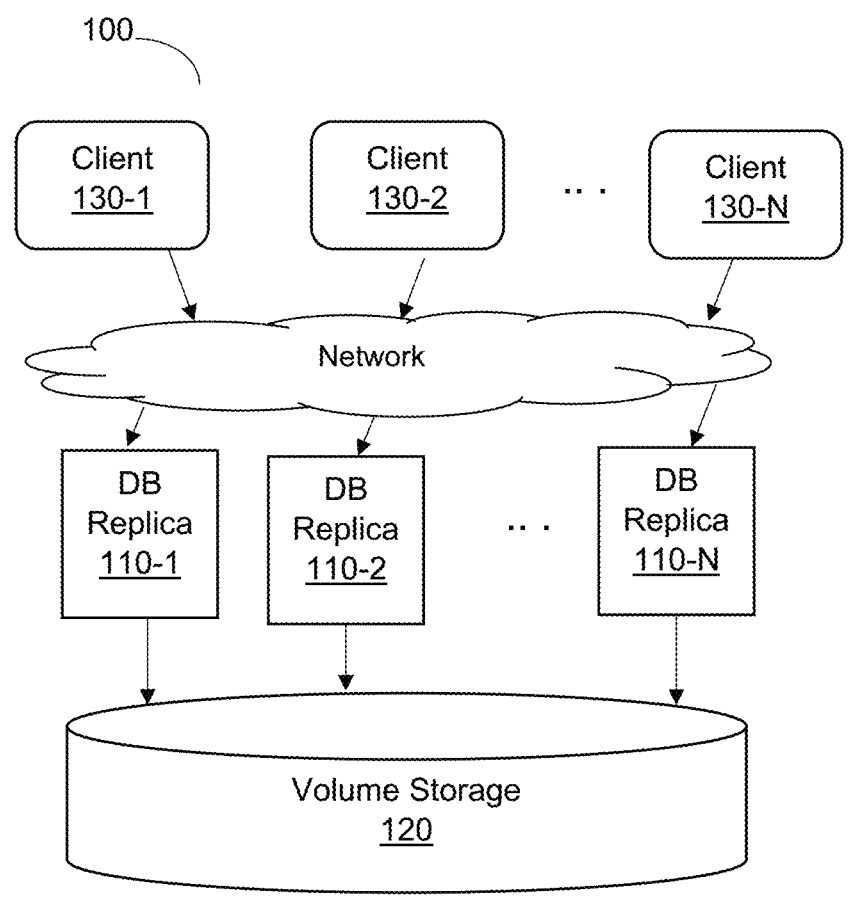
FIG. 1 is a diagram illustrating database replications in a cloud computing environment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, numerals refer to like parts through several views.

The various disclosed embodiments disclose a system and method for performing transactions on the multi-replica RDS while maintaining read-after-write consistency. Specifically, the disclosed embodiments ensure that the latest version of the data stored in a secondary instance of the replica will always be read.

It should be appreciated that maintaining read-after-write consistency is essential when operating in a distributed computing environment, where different processes executed by different servers or services attempt to read and write data from a database holding multiple replicas.

By way of example, the disclosed embodiments include querying a current version of a write replica, querying current versions of read replicas, and waiting for a version stored in at least one of the read replicas to match the version of the write replica. As there are multiple replicas, certain checks are performed to determine what is the most recent version of each replica.

The disclosed embodiments ensure that the recent written version of data is the recent version of data being read, thereby eliminating the read-after-read consistency problem. An application, service, or process can access and read the current version from the multi-replica RDS. Therefore, the disclosed embodiments provide for data integrity not offered by existing solutions.

Figure 2:
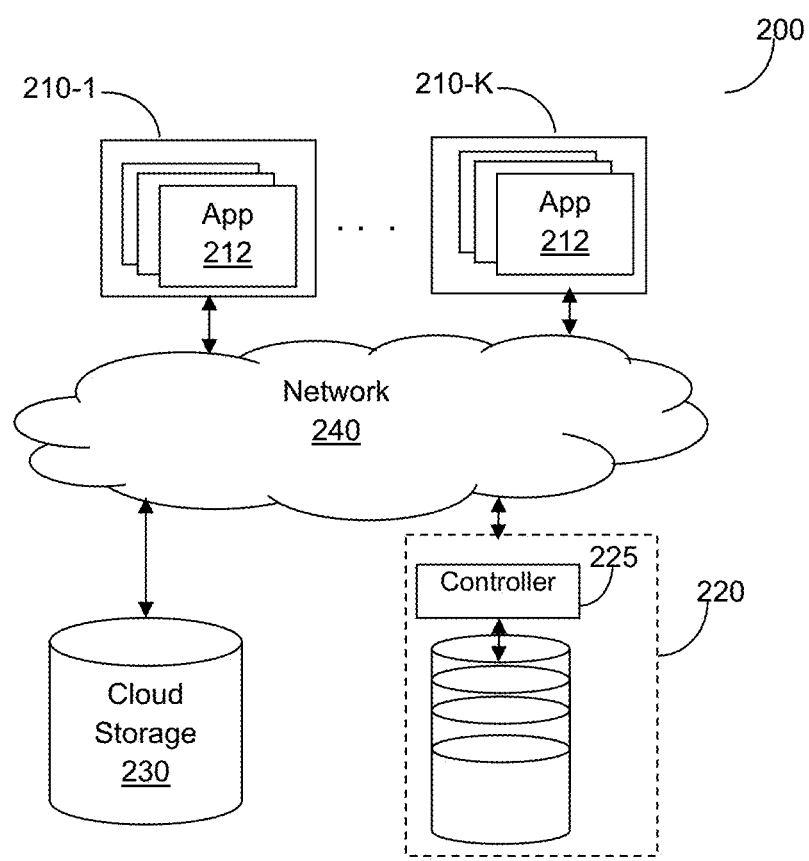
FIG. 2 is an example network diagram utilized to describe the various disclosed embodiments.

FIG. 2 shows an example network diagram 200 utilized to describe the various disclosed embodiments. In the example network diagram 200, a plurality of application servers 210, a multi-replica RDS 220, and a cloud storage 230 are connected to a network 240.

The network 240 may be, but is not limited to, wireless, cellular, or wired network, a local area network (LAN), a wide area network (WAN), a metro area network (MAN), the Internet, the worldwide web (WWW), similar networks, and any combination thereof.

Each application server 210 is configured to execute one or more applications 212, including web applications, cloud applications, and legacy applications. The applications 212 can also represent services or processes. The applications 212 read and write data from the multi-replica RDS 220. It should be noted that an application 212 may further include a service, a process, and the like being performed by each application server 210. It should be noted that multiple applications residing in the same server 210 can access the multi-replica RDS 220.

The application server 210 is configured to read and write data from the multi-replica RDS 220. As an example, a service in an application server 210-1 writes data to the multi-replica RDS 220, and the server 210-2 attempts to read the same data substantially at the same time. Therefore, it is important to ensure that the recent version written to the RDS 220 is read by the server 210-2.

The data stored or accessed through the multi-replica RDS 220 may include any type of data including, but not limited to, audio recordings, video recordings, textual data, images, transcripts, and the like. For example, the multi-replica RDS 220 maintains various customers' information from a customer relationship management (CRM) system, email messages, and sale call recordings.

The multi-replica RDS 220 is a relational database that supports multiple replicas to provide for the speed and availability of databases. The multi-replica RDS 220 is compatible with traditional relational databases, such as MySQL® and PostgreSQL®. In an embodiment, the multi-replica RDS 220 is an Aurora provided by Amazon®.

According to the disclosed embodiments, the multi-replica RDS 220 is configured to include a controller 225. In one implementation, the controller 225 can be a device external to the multi-replica RDS 220. The controller 225 can be realized in software, hardware, firmware, middleware, or any combination thereof. In an embodiment, the controller 225 can be a device external to the multi-replica RDS 220. An example block diagram of controller 225 is provided in FIG. 6.

In an embodiment, the controller 225 is configured to execute the disclosed embodiments to ensure consistency of read-after-write transactions in the multi-replica RDS 220. As noted above, the multi-replica RDS 220 includes multiple replicas, where one of the replicas is designated as a write (or primary), and the rest are read (or secondary) replicas. In a typical multi-replica RDS 220, there are 15 replicas that are fully synchronized. That is, there is a certain time gap between the time that a data is written to the write replica until it is copied to all replicas. As such, a lack of read-after-write consistency often occurs.

To resolve that issue, the controller 225 is configured to monitor all writes to the multi-replica RDS 220, so that only the recent version of the data written to the read replica is read after a write transaction. The DB replicas in the multi-replica RDS 220 are virtual instances that can be scale on demand. As such, the write replica can be dynamically changed during operations. The process performed by the controller 225 is discussed in greater detail below.

In comparison to the multi-replica RDS 220, the cloud storage 230 is not a relational database, but rather provides a backup to the data maintained by the multi-replica RDS 220. An example, the cloud storage 230 may include S3 by Amazon®.

It should be noted that the arrangement of the elements depicted in FIG. 2 is merely for the sake of simplicity. The embodiments disclosed herein can be applied to other arrangements. Further, the elements shown in FIG. 2 may be deployed in different geographical locations and may be part of one or more datacenters, server frames, or a cloud computing platform. The cloud computing platform may be a private cloud, a public cloud, a hybrid cloud, or any combination thereof.

Figure 3A:
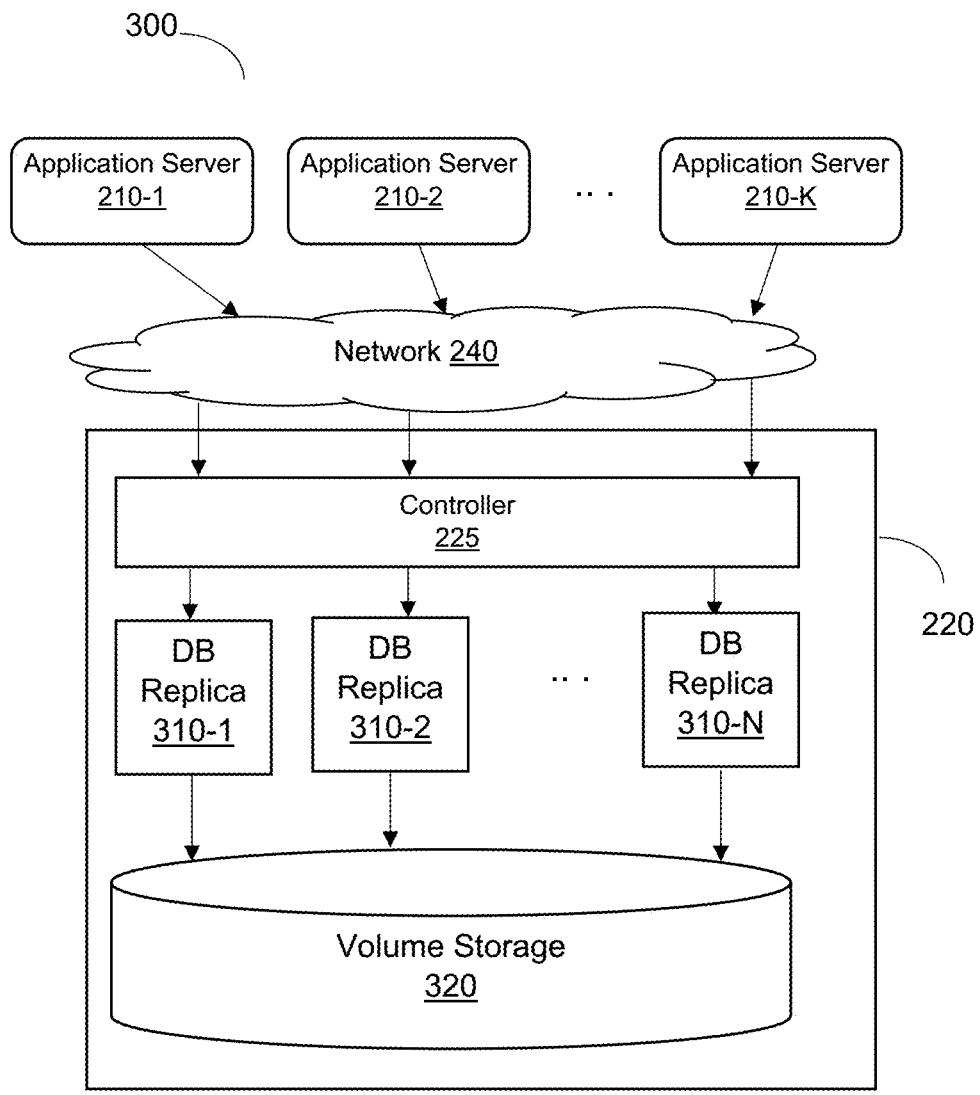
FIG. 3A is a diagram of a multi-replica RDS structured to operate according to the disclosed embodiments.

FIG. 3A is an example diagram 300 of the multi-replica RDS 220 structured to operate according to the disclosed embodiments. The multi-replica RDS 220 includes a plurality of database replica instances (hereinafter a DB replica or DB replicas) 310-1 through 310-Q (where Q is an integer greater than 1), a shared storage volume 320, and a controller 225. The controller 225 is configured to carry out the disclosed embodiments, as will be discussed below. The interface between the DB replicas 310 and the application servers 210 is through the controller 225.

Figure 3B:
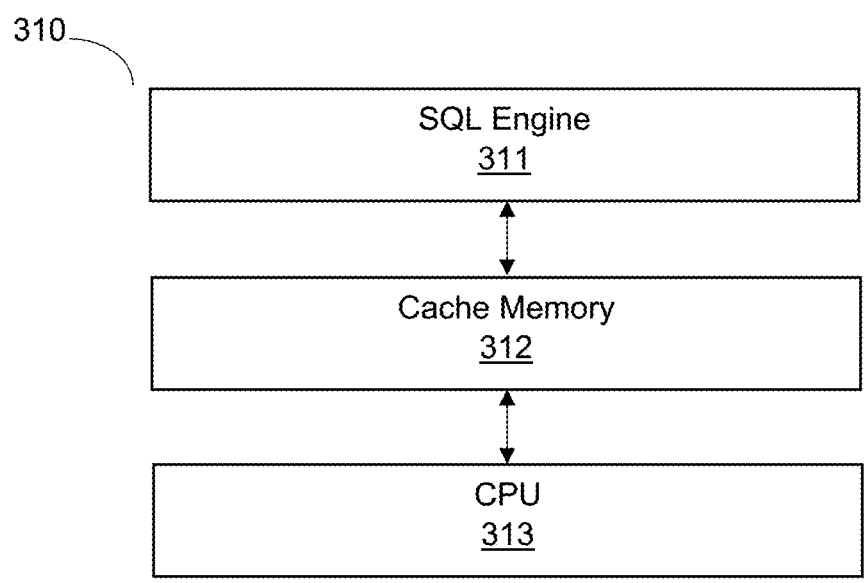
FIG. 3B is a block diagram of a DB replica operable in the multi-replica RDS of FIG. 3A.

As shown in FIG. 3B, each DB replica 310 includes an SQL engine 311, a cache 312, and a CPU (or other processor) 313. The SQL engine 311 is configured to run and respond to transactions received from the application servers. The SQL engine 311 may run MySQL®, PostgreSQL®, and the like. The cache memory 312 temporary holds data to be written to or data that was read from the storage volume 320.

Each DB replica 310 is a live database instance executed over a central processing unit (CPU) 313, or the like. A DB instance is a database environment in a cloud compute platform with compute (i.e., CPU 313) and storage (i.e., cache memory 312) resources. Such resources are allocated based on users' requirements. Each DB instance can support one or more database schemas, depending on the type of the SQL engine 311. The DB replicas 310 being live DB instances, can be allocated and deallocated on-demand.

Returning to FIG. 3A, the DB replicas 310 are designed to have a single write replica (e.g., 310-1) and the rest are read replicas (e.g., 310-2 through 310-N). That is, a piece of data is first written to the write replica 310-1 and then copied from the write replica 310-1 to all read replicas 310-2 through 310-Q.

Typically, there is a watchdog timer set to complete the copying (e.g., up to 60 seconds) of data to all DB replicas. Data in the DB replicas 310 are backed up in the storage volume 320 and potentially in a cloud storage. To track the most current version of data in a write replica (e.g., a DB replica 330-1), on every write transaction, a counter is advanced by 1. That is, the counter value is indicative of the most recent version. Every DB replica 330 is configured to maintain a counter indicating the recent version it holds. Note that on every copy saved in a replica, the counter is updated. The current counter values can be obtained by querying the multi-replica RDS 220.

In an embodiment, the controller 225 is configured to monitor the transactions posted to the DB replicas 310. At every read transaction, the controller 225 is configured to determine the counter value (e.g., current version) of the write replica 310-1 and counter values of all read replicas (310-2, . . . , 310-N). If there is one read replica (e.g., 310-N) having a counter value equal to or greater than the write replica's counter value, the controller 225 is configured to direct the read transaction to this read replica (e.g., 310-Q). Otherwise, the controller 225 is configured to wait until the read replicas are updated and check again if there is one read replica having a current counter value as the write replica. In an embodiment, the controller 225 is configured to wait until all DB replicas are updated to match the current version of the write replica.

It should be noted that by default data will be read from a read replica that a server 210 has an active connection to. For example, if a server 210-1 has an active connection with a DB replica 310-2 that is the current read replica, data will be read from replica 310-2. If the DB replica 310-2 (with the active connection) does not hold the current version, data will be read from another read replica holding the current version.

In an embodiment, a wait time, as defined below, is determined to be shorter than the watchdog timer set for the multi-replica RDS 220. It should be noted that if the read replicas are not updated after the watchdog timer has elapsed, the data is read from the write replica. Typically, when the watchdog timer expires, a restart procedure is triggered by the multi-replica RDS 220. Such a restart procedure is outside the scope of the disclosed embodiments.

It should be noted that reading from the write replica requires opening a new connection to such DB replica which increases latency. Thus, in an optimal operation, data should be read from a read replica with an active connection to the application with an active connection to the read replica.

As noted above, the DB replicas 310 are DB instances that are dynamically allocated or deallocated. Therefore, a DB replica currently designated in a write replica can be changed over time or even at every transaction. To this end, according to the disclosed embodiments, to ensure consistency of read-after-write transactions, the controller 225 is configured to query the current counter values of all DB replicas 310. The replica having the highest counter value is determined to be the write replica.

Figure 4:
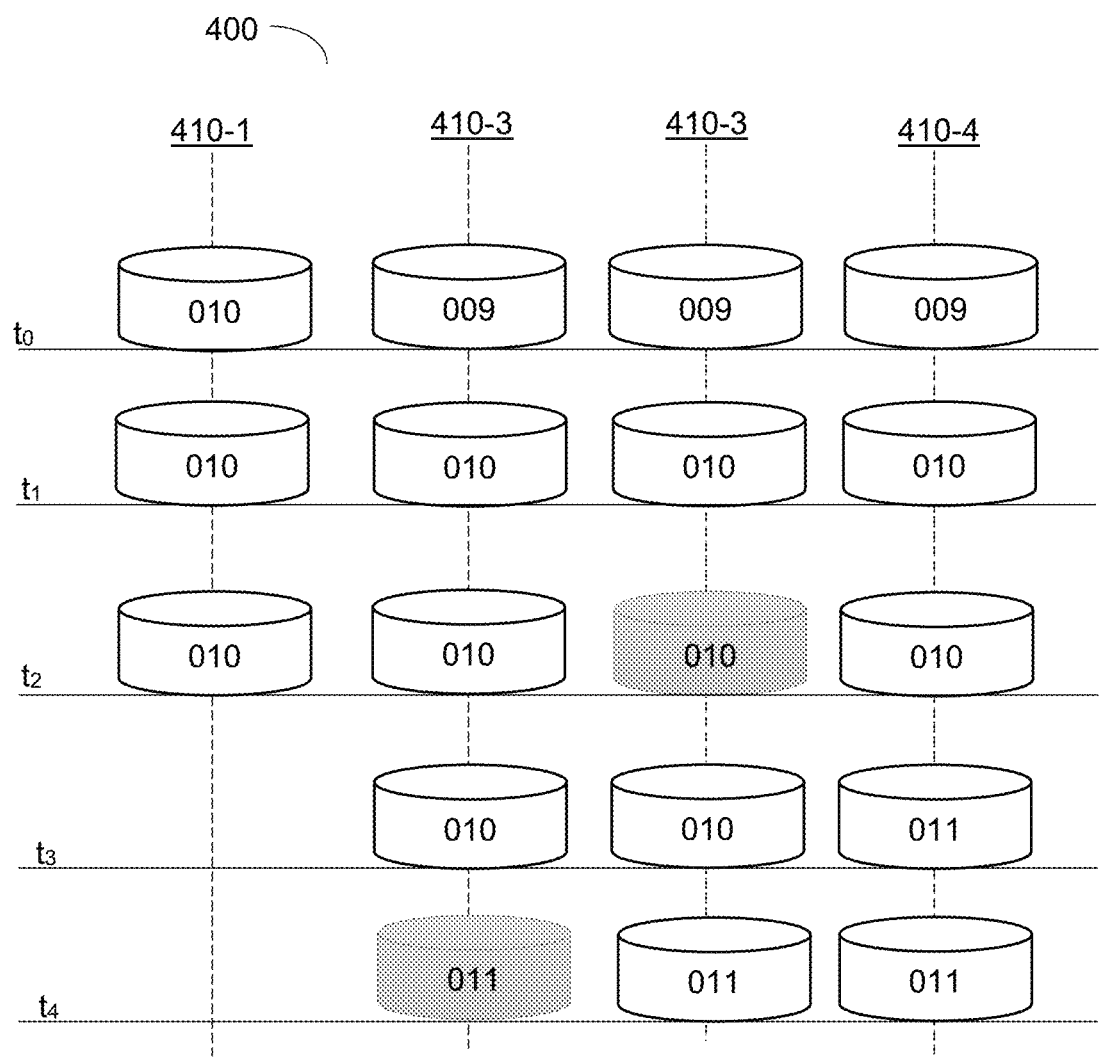
FIG. 4 is a flow diagram demonstrating the method for performing a read-after-write transaction in a multi-replica RDS according to an embodiment.

FIG. 4 shows an example diagram 400 demonstrating a method for performing a read-after-write transaction in a multi-replica RDS according to an embodiment. Diagram 400 demonstrates 4 DB replicas 410-1 through 410-4 and their counter values at different times $t_0$ through $t_4$.

In the example, at $t_0$, replica 410-1 is the write replica and replicas 410-2 and 410-4 are the read replicas. At $t_0$, a read request is received. The counter value (010) of the write replica 410-1 is higher than the values (009) of replicas 410-2, 410-3, and 410-4. As such, there is a wait time between to and $t_1$, during the time window, data is copied from the replica 410-1 to 410-2, 410-3, and 410-4 and their respective counters are advanced.

At $t_2$, the read request is performed from the DB replica 410-2.

At $t_4$, the write replica 410-1 fails, and the DB replica 410-4 is selected to be the write replica. The selection may be arbitrary among all replicas holding the most updated version. Also, at $t_3$, another piece of data is saved to the DB replica 410-4.

At $t_4$, the DB replicas 410-2, and 410-3 are updated with the data stored in the replica 410-4. Thus, the values of the counters have the same values.

Figure 5:
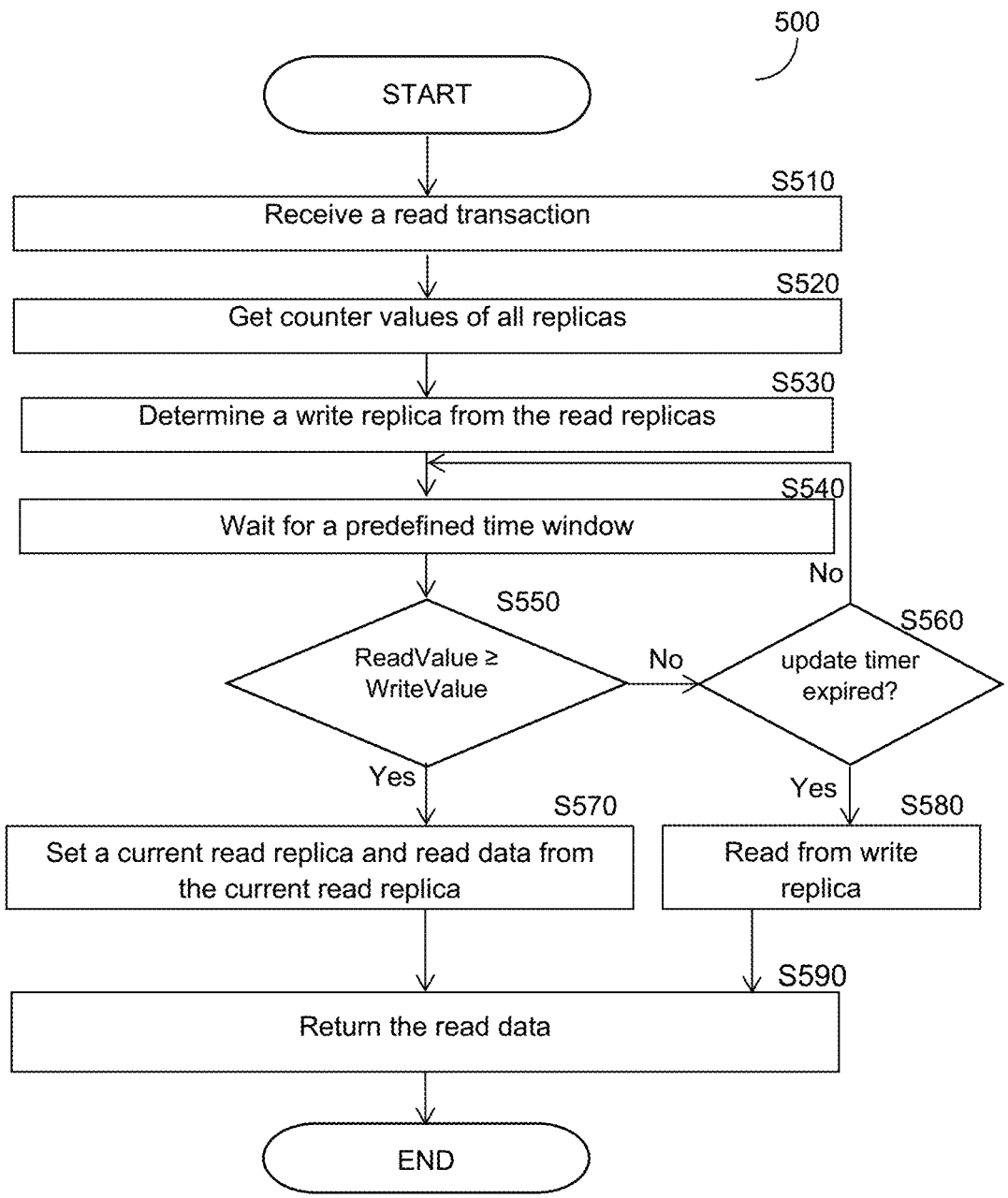
FIG. 5 is a flowchart illustrating a method for performing read-after-write transactions in a multi-tenant RDS according to an embodiment

FIG. 5 is an example flowchart 500 illustrating a method for performing read-after-write transactions in a multi-tenant RDS according to an embodiment. The method may be performed by a controller, such as the controller 225.

At S510, a read request to read data from DB replicas managed by the multi-tenant RDS is received. The read transaction may be generated in response to an SQL query submitted to MySQL® and PostgreSQL®. The received read transaction may be an SQL query.

At S520, the counter values of all DB replicas in the multi-tenant RMS are retrieved. Such values can be retrieved by querying the multi-tenant RDS. In an embodiment, when there is a designated write replica, as defined above, the counter value of such replica is being read. In addition, the time it takes the multi-tenant RDS to update DB replicas may also be retrieved.

At S530, the write replica is determined based on the replica holding the highest counter value. In an embodiment, when the write replica is already designated, S530 is optional. It should be noted that the determination based on the highest counter value is only an example applicable for incremented counter values, and other tests can be utilized. For example, if the counter value is a timestamp, the most recent timestamp would determine the write replica.

At S540, execution waits for a predefined time window (hereinafter the "wait time"). The wait time is set to be shorter than the time for the watchdog timer of the multi-tenant RDS. In an embodiment, the wait time is determined based on the time it takes to update DB replicas in the multi-tenant RDS. Such an update time can be retrieved by querying the multi-tenant RDS. For example, if the update time is 2 seconds, the wait time would be set to 2 seconds. It should be noted that the wait time can be changed at any transaction. At the first iteration the wait time may be set to zero.

At S550, it is checked if there is a DB replica other than the determined write replica holding a counter value (ReadValue) equal to, or greater than the counter value (WriteValue) of the write replica. If so, execution continues with S570; otherwise, execution proceeds to S560.

At S560, it is checked if an update timer has expired, and if so, execution continues with S580; otherwise, execution returns to S540. The update timer is set to be longer than the wait time, but shorter than the watchdog timer. As noted above, the watchdog timer is indicative that the RDS cannot update the DB replicas and a restart process is triggered. The update timer ensures that there is an opportunity to read data from the RDS before the restart process is triggered.

At S580, requested data is read from the write replica. Reading data from the write replica occurs when the DB replicas have not been updated with the contents of the write replica.

Execution reaches S570 when the DB replicas have been updated and there is at least one available data replica. Thus, at S570 the current read replica is set. Such a replica holds a counter value (ReadValue) equals to, or greater than the counter value (WriteValue) of the write replica is set as a current read replica. Then, data is read from the DB replica set as a current read replica.

At S590, the data (read at S570 or S580) is returned to the application server that initiated the read request. The method can be performed for any read request (or transaction) received after a write (or transaction).

Figure 6:
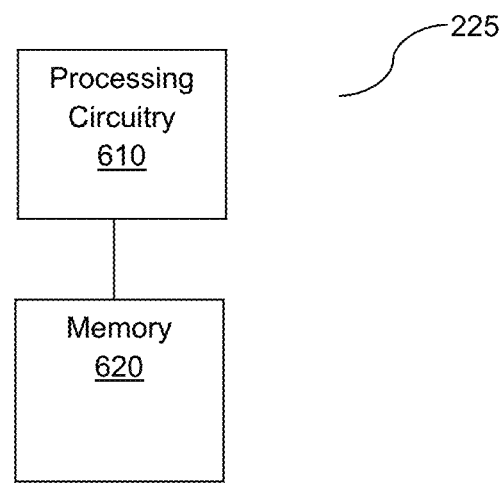
FIG. 6 is a schematic diagram of a controller according to an embodiment.

FIG. 6 is an example schematic diagram of the controller 225 according to an embodiment. The controller 225 may be realized as a processing circuitry 610 coupled to a memory 620. The processing circuitry 610 may be realized as one or more hardware logic components and circuits. For example, and without limitation, illustrative types of hardware logic components that can be used include field-programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read-only memory, flash memory, etc.), or a combination thereof. In one configuration, software for implementing one or more embodiments disclosed herein may be stored in the memory 620. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein. The memory 620 can also be utilized to store the current values of the counters of the replicas in the multi-replica RDS.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for providing consistency in read-after-write operations in a multi-replica relational database system (RDS), comprising:
   receiving a read transaction to read data from a database (DB) replica of the multi-replica RDS;
   obtaining counter values of DB replicas in the multi-replica RDS, wherein each counter value of a respective DB replica in the multi-replica RDS determines a current version of recent data stored in the respective DB replica;
   determining a write replica out of the DB replicas in the multi-replica RDS;
   determining if there is an available read replica, wherein a read replica is a replica other than the determined write replica and having a counter value of the read replica that is at least equal to a counter value of the write replica;
   waiting, when there is no available read replica, a preconfigured time window to allow all the DB replicas to synchronize with the write replica; and
   reading the data from the read replica when the preconfigured time window has elapsed.

2. The method of claim 1, wherein determining the write replica further comprises:
   selecting a first DB replica out of the DB replicas having a maximum counter value as the write replica.

3. The method of claim 1, further comprising:
   reading data from the write replica when there is no available read replica, after the preconfigured time window has elapsed.

4. The method of claim 3, further comprising:
   returning the data read from either the write replica or the read replica to an application server requesting the read transaction.

5. The method of claim 1, wherein the read transaction is posted to an SQL engine.

6. The method of claim 5, wherein the SQL engine is any one of: MySQL and PostgreSQL.

7. The method of claim 1, wherein the preconfigured time window is shorter than a watchdog timer in the multi-replica RDS.

8. The method of claim 1, wherein the preconfigured time window is set based on an update time parameter set by the multi-replica RDS.

9. The method of claim 1, wherein the read transaction is received substantially received after a completion of a write transaction in the multi-replica RDS.

10. A non-transitory computer readable medium having stored thereon instructions for causing a processing circuitry to execute a process for providing consistency in read-after-write operations in a multi-replica relational database system (RDS), the process comprising:
    receiving a read transaction to read data from a database (DB) replica of the multi-replica RDS;
    obtaining counter values of DB replicas in the multi-replica RDS, wherein each counter value of a respective DB replica in the multi-replica RDS determines a current version of recent data stored in the respective DB replica;
    determining a write replica out of the DB replicas in the multi-replica RDS;
    determining if there is an available read replica, wherein a read replica is a replica other than the determined write replica and having a counter value of the read replica that is at least equal to a counter value of the write replica;
    waiting, when there is no available read replica, a preconfigured time window to allow all the DB replicas to synchronize with the write replica; and
    reading the data from the read replica when the preconfigured time window has elapsed.

11. A controller for providing consistency in read-after-write operations in a multi-replica relational database system (RDS), comprising:
    a processing circuitry; and
    a memory, the memory containing instructions that, when executed by the processing circuitry, configure the controller to:
    receive a read transaction to read data from a database (DB) replica of the multi-replica RDS;
    obtain counter values of DB replicas in the multi-replica RDS, wherein each counter value of a respective DB replica in the multi-replica RDS determines a current version of recent data stored in the respective DB replica;
    determine a write replica out of the DB replicas in the multi-replica RDS;
    determine if there is an available read replica, wherein a read replica is a replica other than the determined write replica and having a counter value of the read replica that is at least equal to a counter value of the write replica;

wait, when there is no available read replica, a preconfigured time window to allow all the DB replicas to synchronize with the write replica; and read the data from the read replica when the preconfigured time window has elapsed.

12. The controller of claim 11, wherein the controller is further configured to:

select a first DB replica out of the DB replicas having a maximum counter value as the write replica.

13. The controller of claim 11, wherein the controller is further configured to:

read data from the write replica when there is no available read replica, after the preconfigured time window has elapsed.

14. The controller of claim 11, wherein the controller is further configured to:

return the data read from either the write replica or the read replica to an application server requesting the read transaction.

15. The controller of claim 11, wherein the read transaction is posted to an SQL engine.

16. The controller of claim 15, wherein the SQL engine is any one of: MySQL and PostgreSQL.

17. The controller of claim 11, wherein the preconfigured time window is shorter than a watchdog timer in the multi-replica RDS.

18. The controller of claim 11, wherein the preconfigured time window is set based on an update time parameter set by the multi-replica RDS.

19. The controller of claim 11, wherein the read transaction is received substantially received after a completion of a write transaction in the multi-replica RDS.

20. The controller of claim 11, wherein the controller is integrated in the multi-replica relational database system (RDS).

* * * * *